(12) United States Patent
Schantz et al.

(10) Patent No.: US 6,998,230 B1
(45) Date of Patent: Feb. 14, 2006

(54) ARRAY FABRICATION WITH DROP DETECTION

(75) Inventors: Christopher A. Schantz, Redwood City, CA (US); Kyle J. Schleifer, Sunnyvale, CA (US); William D. Fisher, San Jose, CA (US); Richard P. Tella, Sunnyvale, CA (US); Michael P. Caren, Palo Alto, CA (US); Peter G. Webb, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 572 days.

(21) Appl. No.: 09/558,532

(22) Filed: Apr. 26, 2000

(51) Int. Cl.
*C12Q 1/68* (2006.01)
*C12M 1/36* (2006.01)
*G01N 15/06* (2006.01)

(52) U.S. Cl. .................... 435/6; 435/283.1; 435/287.2; 422/58; 422/68.1; 422/100; 347/6; 347/19; 347/163; 346/1.1

(58) Field of Classification Search ................. 347/19, 347/163, 6; 435/6, 287.2, 283.1; 422/58, 422/100, 68.1; 346/1.1

See application file for complete search history.

(56) References Cited

U.S. PATENT DOCUMENTS

| 4,067,019 | A | | 1/1978 | Fleischer et al. ............. 346/75 |
| 4,128,841 | A | | 12/1978 | Brown et al. ................. 346/75 |
| 4,323,905 | A | | 4/1982 | Reitberger et al. ........... 346/75 |
| 4,872,028 | A | | 10/1989 | Lloyd ........................ 346/1.1 |
| 5,124,720 | A | | 6/1992 | Schantz ...................... 346/1.1 |
| 5,442,384 | A | * | 8/1995 | Schantz et al. .............. 346/20 |
| 5,474,796 | A | * | 12/1995 | Brennan ..................... 427/2.13 |
| 6,086,190 | A | * | 7/2000 | Schantz et al. ............... 347/6 |
| 6,239,273 | B1 | * | 5/2001 | Pease et al. ............... 536/25.3 |

FOREIGN PATENT DOCUMENTS

EP 0334546 A2 9/1989

* cited by examiner

*Primary Examiner*—BJ Forman
(74) *Attorney, Agent, or Firm*—Gordon Stewart (57) ABSTRACT

A drop deposition apparatus, and a method and computer program products using the drop deposition apparatus, for fabricating at least one addressable array of biopolymers on a substrate. The drop deposition apparatus has a drop dispenser unit and a sensing element. The method comprises includes for each of multiple addresses, dispensing droplets carrying the biopolymers or biopolymer precursors from a drop dispenser unit onto the sensing element, and onto the substrate so as to fabricate the array. Electrical signals resulting from dispensed droplets striking the sensing element are detected. A performance characteristic of the deposition apparatus is evaluated based on the detected signals.

18 Claims, 5 Drawing Sheets

ARRAY FABRICATION WITH DROP DETECTION

FIELD OF THE INVENTION

This invention relates to arrays, particularly polynucleotide arrays such as DNA arrays, which are useful in diagnostic, screening, gene expression analysis, and other applications.

BACKGROUND OF THE INVENTION

Polynucleotide arrays (such as DNA or RNA arrays), are known and are used, for example, as diagnostic or screening tools. Such arrays include regions of usually different sequence polynucleotides arranged in a predetermined configuration on a substrate. These regions (sometimes referenced as "features") are positioned at respective locations ("addresses") on the substrate. The arrays, when exposed to a sample, will exhibit an observed binding pattern. This binding pattern can be detected upon interrogating the array. For example all polynucleotide targets (for example, DNA) in the sample can be labeled with a suitable label (such as a fluorescent compound), and the fluorescence pattern on the array accurately observed following exposure to the sample. Assuming that the different sequence polynucleotides were correctly deposited in accordance with the predetermined configuration, then the observed binding pattern will be indicative of the presence and/or concentration of one or more polynucleotide components of the sample.

Biopolymer arrays can be fabricated by depositing previously obtained biopolymers (such as from synthesis or natural sources) onto a substrate, or by in situ synthesis methods. Methods of depositing obtained biopolymers include loading then touching a pin or capillary to a surface, such as described in U.S. Pat. No. 5,807,522 or deposition by firing from a pulse jet such as an inkjet head, such as described in PCT publications WO 95/25116 and WO 98/41531, and elsewhere. For in situ fabrication methods, multiple different reagent droplets are deposited at a given target location in order to form the final feature (hence a probe of the feature is synthesized on the array stubstrate). The in situ fabrication methods include those described in U.S. Pat. No. 5,449,754 for synthesizing peptide arrays, and described in WO 98/41531 and the references cited therein for polynucleotides. The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence is as follows: (a) coupling a selected nucleoside through a phosphite linkage to a functionalized support in the first iteration, or a nucleoside bound to the substrate (i.e. the nucleoside-modified substrate) in subsequent iterations; (b) optionally, but preferably, blocking unreacted hydroxyl groups on the substrate bound nucleoside; (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The functionalized support (in the first cycle) or deprotected coupled nucleoside (in subsequent cycles) provides a substrate bound moiety with a linking group for forming the phosphite linkage with a next nucleoside to be coupled in step (a). Final deprotection of nucleoside bases can be accomplished using alkaline conditions such as ammonium hydroxide, in a known manner.

The foregoing chemistry of the synthesis of polynucleotides is described in detail, for example, in Caruthers, *Science* 230: 281–285, 1985; Itakura et al., *Ann. Rev. Biochem.* 53: 323–356; Hunkapillar et al., *Nature* 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. No. 4,458,066, U.S. Pat. No. 4,500,707, U.S. Pat. No. 5,153,319, U.S. Pat. No. 5,869,643, EP 0294196, and elsewhere The phosphoramidite and phosphite triester approaches are most broadly used, but other approaches include the phosphodiester approach, the phosphotriester approach and the H-phosphonate approach. The substrates are typically functionalized to bond to the first deposited monomer. Suitable techniques for functionalizing substrates with such linking moieties are described, for example, in Southern, E. M., Maskos, U. and Elder, J. K., Genomics, 13, 1007–1017, 1992. In the case of array fabrication, different monomers may be deposited at different addresses on the substrate during any one iteration so that the different features of the completed array will have different desired biopolymer sequences. One or more intermediate further steps may be required in each iteration, such as the conventional oxidation and washing steps in the case of in situ fabrication of polynucleotide arrays.

In array fabrication, the quantities of polynucleotide available, whether by deposition of previously obtained polynucleotides or by in situ synthesis, are usually very small and expensive. Additionally, sample quantities available for testing are usually also very small and it is therefore desirable to simultaneously test the same sample against a large number of different probes on an array. These conditions require use of arrays with large numbers of very small, closely spaced features. It is important in such arrays that features actually be present, that they are put down accurately in the desired target pattern, are of the correct size, and that the DNA is uniformly coated within the feature. If any of these conditions are not met within a reasonable tolerance, and the array user is not aware of deviations outside such tolerance, the results obtained from a given array may be unreliable and misleading. This of course can have serious consequences to diagnostic, screening, gene expression analysis or other purposes for which the array is being used. However, in any system used to fabricate arrays with large numbers of the required small features, there is likely to be some degree of error, either fixed (and hence repeated) and/or random.

It would be desirable then to provide a means by which errors in features resulting during array fabrication, can be readily determined. It would also be desirable if such errors can be corrected or tracked.

SUMMARY OF THE INVENTION

In array fabrication using deposition of previously obtained polynucleotides or using the in situ method, errors can result from many sources. For example, different drop dispensers (such as pulse jets which eject drops toward a surface) may be provided to deposit the previously obtained polynucleotides or, in the case of the in situ method, different phosphoramidite droplets. Each nozzle may have its own inherent fixed drop dispensing error (such as error in drop dispenser position within a head, droplet size, or direction of drop). Also, the positioning system may have fixed inherent errors. Further, random errors can occur which are different during the dispensing of any droplet. For example, air currents may vary during different droplet dispensing steps, or ambient temperature variations may cause expansion/contraction in dispensing apparatus components which affects absolute and/or relative positions of dispensed droplets. Also, drops ejected from a pulse jet may break up before contacting a substrate on which an array is to be formed. Further, in the case where multiple droplets are used to form a feature, such as in the in situ method, an error in the final feature may be a sum of errors from individual droplet deposition at each feature. The present invention provides a means of detecting errors and optionally tracking or correcting them.

The present invention then, provides a method of fabricating at least one addressable array of biopolymers on a substrate with an apparatus having a drop dispensing unit and a sensor. Droplets carrying the biopolymers or biopolymer precursors are dispensed from the drop dispensing unit onto the sensing element. Droplets are also dispensed onto the substrate, for each of multiple addresses, so as to fabricate the array. Electrical signals are detected with result from dispensed droplets striking the sensing element (for example as a result of the signals result from the droplets imparting an electrical stimulus to the sensing element). A performance characteristic of the apparatus is evaluated based on the detected signals.

The method may optionally include other aspects. For example, when after the dispensing of some droplets onto the substrate an error is detected in which an evaluated performance characteristic is outside a predetermined tolerance, then the source of the error is corrected prior to dispensing of other of the droplets onto that same substrate or the apparatus is operated so as to compensate for the error. In a particular example of the foregoing the error may be detected after the dispensing of some of the droplets for an array. In this case, the source of the error may be corrected prior to dispensing of other of the droplets for the same array or the apparatus may be operated so as to compensate for the error during dispensing of other of the droplets for the same array. In another example multiple arrays are fabricated on the same substrate, and the error is detected after the dispensing of droplets for at least one of the arrays on the same substrate. In this case, the source of the error may be corrected prior to dispensing of droplets for other of the arrays on the same substrate or the apparatus may be operated so as to compensate for the error during dispensing of droplets for the same array or other of the arrays on the same substrate.

The method may additionally include changing a set of one or more reagents in the dispenser unit to a different set of reagents. In this case, the detection and evaluation may be performed after the changing and before a dispensing of any droplets for an array.

Methods of the present invention may also include correlating the detected error with one or more features on the array which are defective as a result of the error, or rejecting an array based on the evaluated performance characteristic of the apparatus, or communicating information relating to the defective features to a remote location or saving such information onto a storage medium. In the case where the dispenser unit comprises one or more pulse jets which eject a droplet in response to a signal and which require priming, the evaluated performance characteristic may be whether one or more of the pulse jets are primed prior to dispensing any droplets for an array. When a de-priming error is detected in which at least one of the pulse jets is not primed, then the method may include re-priming the pulse jet (such as by firing the pulse jet one or more times until the detected electrical signals indicate the pulse jet is primed).

In one aspect of the method, the dispenser unit is repeatedly scanned across the substrate while dispensing droplets so as to fabricate the array. In this case, the sensing element is struck by droplets so as to generate electrical signals, when the dispenser unit passes beyond the array being fabricated on multiple scans during fabrication of the array (this can happen on each of multiple scans used to fabricated the array, or less than each of those multiple scans). In another aspect, the sensor may comprise the substrate. In this case, actual drops deposited to form an array can provide the signals which are used in the evaluation process of the method.

One or more of any of various performance characteristics may be evaluated. These can include the size, velocity or placement of droplets dispensed from the dispenser unit. Velocity may be evaluated, for example, based on the difference in time between when the dispenser unit was activated to dispense a droplet, and the time when the resulting signal is detected. In another example of evaluating velocity, multiple droplets are dispensed from the dispenser unit at each of at least two different distances from the sensor. In this case droplet velocity may be evaluated based on the phase difference between the detected signal from multiple droplets at each distance. Placement of droplets may be evaluated, for example, from the relative positions of the dispenser unit and the sensing element when a series of droplets dispensed at different relative positions of the dispenser unit and sensing element begin or cease striking the sensing element. One particular method of droplet placement evaluation may use a sensing element which has an insensitive region intermediate sensitive regions such that a signal is not generated by the sensing element when a dispensed droplet becomes co-incident with the insensitive region. In this case, the placement of droplets may be evaluated from the relative positions of the drop dispenser unit and the sensing element when a series of droplets dispensed at different relative positions of the drop dispenser unit and sensing element, begin or cease striking the sensing element at a region about the insensitive region. Examples of an insensitive region include an opening in a sensitive area, or a gap between sensitive regions in the form of linear conductors.

The present invention further provides an apparatus for fabricating at least one addressable array of biopolymers on a substrate, in accordance with any one or more of the methods of the present invention. In a particular aspect, the apparatus may include the drop dispensing unit and the sensing element, as well as an amplifier to detect electrical signals resulting from dispensed droplets striking the sensing element.

In one aspect of the apparatus, the drop dispensing unit may have at least six (or at least seven or ten) dispensers each of which can deposit droplets carrying the biopolymers or biopolymer precursors onto different addresses on the substrate so as to fabricate the array. Additionally, at least six (or at least seven or ten) reservoirs may communicate with respective dispensers such that the dispensing unit can be simultaneously loaded with, and dispense between loadings, at least six (or at least seven or ten) different biopolymers or biopolymer precursors. While various sensing elements may be used, in one embodiment the sensing element and amplifier detect electrical signals resulting from the droplets imparting an electrical stimulus to the sensing element.

In another aspect, the apparatus includes a processor. The processor may control the apparatus, such as the dispensing unit, so that the apparatus can perform any one or more of the methods of the present invention. For example, the processor may cause the drop dispensing unit to dispense droplets toward the sensing element after the dispensing of some droplets onto the substrate (for example, for one or multiple ones of arrays to be fabricated on a substrate), and evaluates a performance characteristic of the dispensing unit based on the resulting detected signals. Also, when an error is detected in which an evaluated performance characteristic is outside a predetermined tolerance then the processor, prior to causing the drop dispenser to dispense droplets onto that same substrate (for example, for the same one or other of multiple arrays to be fabricated on the substrate), may activate an operator alert or operate the apparatus so as to correct for the error before, or compensate for the error during, dispensing of other of the droplets onto that same substrate. An example of correcting the error before the dispensing of other droplets includes, when the above described de-priming error is detected, repeatedly firing the pulse jet to obtain re-priming. An example of compensating for the error during dispensing of other droplets includes, when the dispensing unit has multiple dispensers and an error in the presence, size or position of droplets dispensed by any one of the dispensers is detected, then operating other of the dispensers to compensate for the error (for example, the drop dispensing pattern may be altered to obtain the necessary compensation such that the resulting actual array configuration is closer to the desired array configuration than would have been the case without the compensation).

The processor may perform any other function such that the apparatus can execute one or more of the methods of the present invention. These include controlling the relative positions of the substrate and dispenser unit, and the dispensing of droplets from the dispenser unit to the sensing unit and to form the array. As another example, the processor may perform the correlation of the detected error with one or more features on the array which are defective as a result of the error. In another example, the processor communicates information relating to the defective features to a remote location or saves such information onto a storage medium (for example, by forwarding the information to a communication module or a storage device which can write onto the storage medium). As another example, the processor may evaluate the velocity of droplets by tracking the time difference between when the processor causes a dispensing unit to dispense a drop, and when the sensing element is struck by that drop. This may also be done by the processor causing one or more drops to be dispensed from at least two different positions and determining the phase difference of the resulting signals from the sensing element. Similarly, as to position, the processor may control the position from which the dispensing unit dispenses a droplet and compares that to a position detected by the sensing element.

The present invention further provides a computer program product comprising a computer readable storage medium carrying computer readable program code, for use with an apparatus of the present invention such that the apparatus may execute a method of the present invention. The program code when loaded into a computer of the apparatus may control the required drop dispensing, detecting, evaluating and other steps (such as activating an operator alert or operating the dispensing unit so as to correct for the error before, or compensate for the error during, dispensing of other of the droplets onto that same substrate, or performing the above described correlation).

The various aspects of the present invention can provide any one or more of the following and/or other useful benefits. For example, droplet deposition errors during array fabrication can be readily determined with a simple apparatus. This allows for rejection of arrays with serious errors. Alternatively, such errors can be in some cases be corrected or compensated for during fabrication, or the errors can be tracked. Tracked errors can forwarded to a remote location for use in interrogating or processing interrogation results from the corresponding array.

BRIEF DESCRIPTION OF THE DRAWINGS

To facilitate understanding, identical reference numerals have been used, where practical, to designate identical elements that are common to the figures.

DETAILED DESCRIPTION OF EMBODIMENTS OF THE INVENTION

In the present application, unless a contrary intention appears, the following terms refer to the indicated characteristics. A "biopolymer" is a polymer of one or more types of repeating units. Biopolymers are typically found in biological systems (although they may be made synthetically) and particularly include peptides or polynucleotides, as well as such compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions. Polynucleotides include single or multiple stranded configurations, where one or more of the strands may or may not be completely aligned with another. A "nucleotide" refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "biopolymer" includes DNA (including cDNA), RNA, oligonucleotides, and PNA and other polynucleotides as described in U.S. Pat. No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides. A "biomonomer" references a single unit, which can be linked with the same or other biomonomers to form a biopolymer (for example, a single amino acid or nucleotide with two linking groups one or both of which may have removable protecting groups). A "peptide" is used to refer to an amino acid multimer of any length (for example, more than 10, 10 to 100, or more amino acid units). A biomonomer fluid or biopolymer fluid reference a liquid containing either a biomonomer or biopolymer, respectively (typically in solution).

An "array", unless a contrary intention appears, includes any one, two or three dimensional arrangement of addressable regions bearing a particular chemical moiety to moieties (for example, biopolymers such as polynucleotide sequences) associated with that region. An array is "addressable" in that it has multiple regions of different moieties (for example, different polynucleotide sequences) such that a region (a "feature" or "spot" of the array) at a particular predetermined location (an "address") on the array will detect a particular target or class of targets (although a feature may incidentally detect non-targets of that feature). Array features are typically, but need not be, separated by intervening spaces. In the case of an array, the "target" will be referenced as a moiety in a mobile phase (typically fluid), to be detected by probes ("target probes") which are bound to the substrate at the various regions. However, either of the "target" or "target probes" may be the one which is to be evaluated by the other (thus, either one could be an unknown mixture of polynucleotides to be evaluated by binding with the other). An "array layout" refers collectively to one or more characteristics of the features, such as feature positioning, one or more feature dimensions, and some indication of a moiety at a given location. "Hybridizing" and "binding", with respect to polynucleotides, are used interchangeably.

When one item is indicated as being "remote" from another, this is referenced that the two items are at least in different buildings, and may be at least one mile, ten miles, or at least one hundred miles apart. "Communicating" information references transmitting the data representing that information over a suitable communication channel (for example, a private or public network). "Forwarding" an item refers to any means of getting that item from one location to the next, whether by physically transporting that item and includes, at least in the case of data, physically transporting a medium carrying the data or communicating the data. An array "package" may be the array plus only a substrate on which the array is deposited, although the package may include other features (such as a housing with a chamber). It will also be appreciated that throughout the present application, that words such as "top", "upper", and "lower" are used in a relative sense only. "Fluid" is used herein to reference a liquid. A "set" or a "sub-set" may have one or more members (for example, one or more droplets). Reference to a singular item, includes the possibility that there are plural of the same items present. All patents and other cited references are incorporated into this application by reference.

Figure 1:
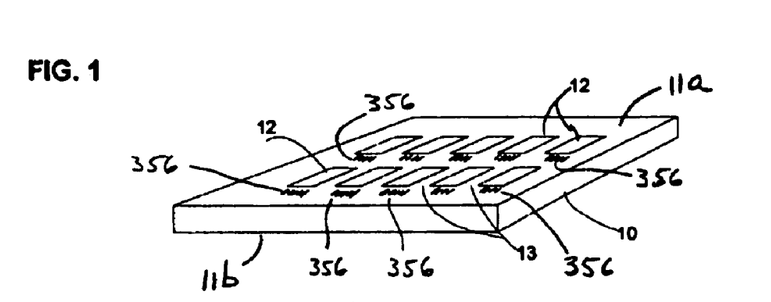
FIG. 1 illustrates a substrate carrying multiple arrays, such as may be fabricated by methods of the present invention.
Figure 2:
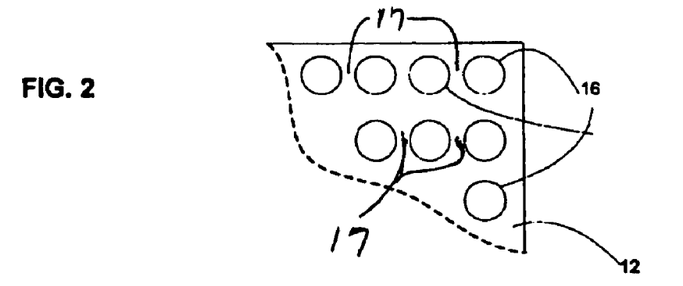
FIG. 2 is an enlarged view of a portion of FIG. 1 showing multiple ideal spots or features.
Figure 3:
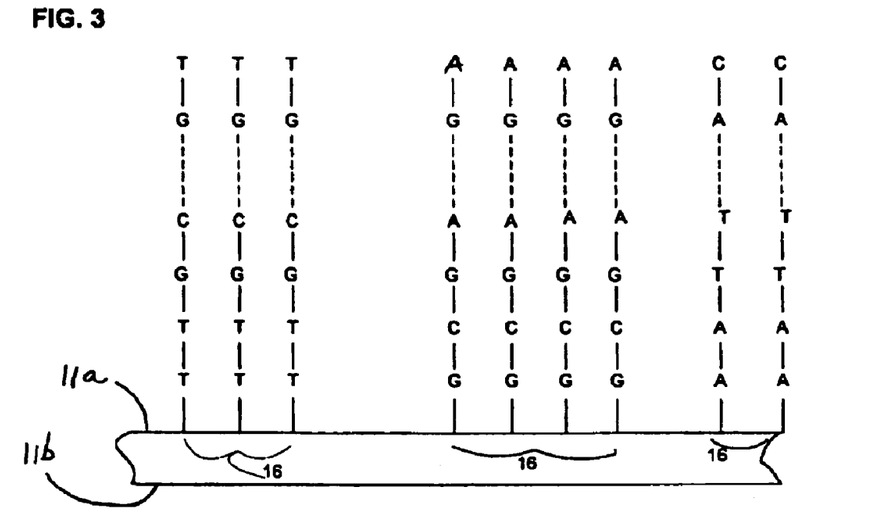
FIG. 3 is an enlarged illustration of a portion of the substrate in FIG. 2.

Referring first to FIGS. 1–3, typically methods and apparatus of the present invention generate or use a contiguous planar substrate 10 carrying one or more arrays 12 disposed across a front surface 11a of substrate 10 and separated by inter-array areas 13. A back side 11b of substrate 10 does not carry any arrays 12. The arrays on substrate 10 can be designed for testing against any type of sample, whether a trial sample, reference sample, a combination of them, or a known mixture of polynucleotides (in which latter case the arrays may be composed of features carrying unknown sequences to be evaluated). Each array 12 has associated with it a unique identification in the form of a bar code 356. While ten arrays 12 are shown in FIG. 1 and the different embodiments described below may use substrates with particular numbers of arrays, it will be understood that substrate 10 and the embodiments to be used with it, may use any number of desired arrays 12. Similarly, substrate 10 may be of any shape, and any apparatus used with it adapted accordingly. Depending upon intended use, any or all of arrays 12 may be the same or different from one another and each will contain multiple spots or features 16 of biopolymers in the form of polynucleotides. A typical array may contain from more than ten, more than one hundred, more than one thousand or ten thousand features, or even more than from one hundred thousand features. All of the features 16 may be different, or some or all could be the same. In the embodiment illustrated, there are interfeature areas 17 between features, which do not carry any polynucleotide. It will be appreciated though, that the interfeature areas 17 could be of various sizes and configurations. It will also be appreciated that there need not be any space separating arrays 12 from one another. However, in the case where arrays 12 are formed by depositing for each feature one or more droplets of a reagent such as by using a pulse jet such as an inkjet type head, interfeature areas 17 will typically be present. Each feature carries a predetermined polynucleotide (which includes the possibility of mixtures of polynucleotides). As per usual, A, C, G, T represent the usual nucleotides. It will be understood that there is usually a linker molecule (not shown) of any known types between the front surface 11a and the first nucleotide.

FIGS. 2 and 3 illustrate ideal features where the actual features formed are the same as the target (or "aim") features, with each feature 16 being uniform in shape, size and composition, and the features being regularly spaced. Such an array when fabricated by the in situ method, would require all reagent droplets for each feature to be uniform in shape and accurately deposited at the target feature location. In practice, such an ideal result is difficult to obtain due to both the fixed and random errors such as those discussed above.

Figure 4:
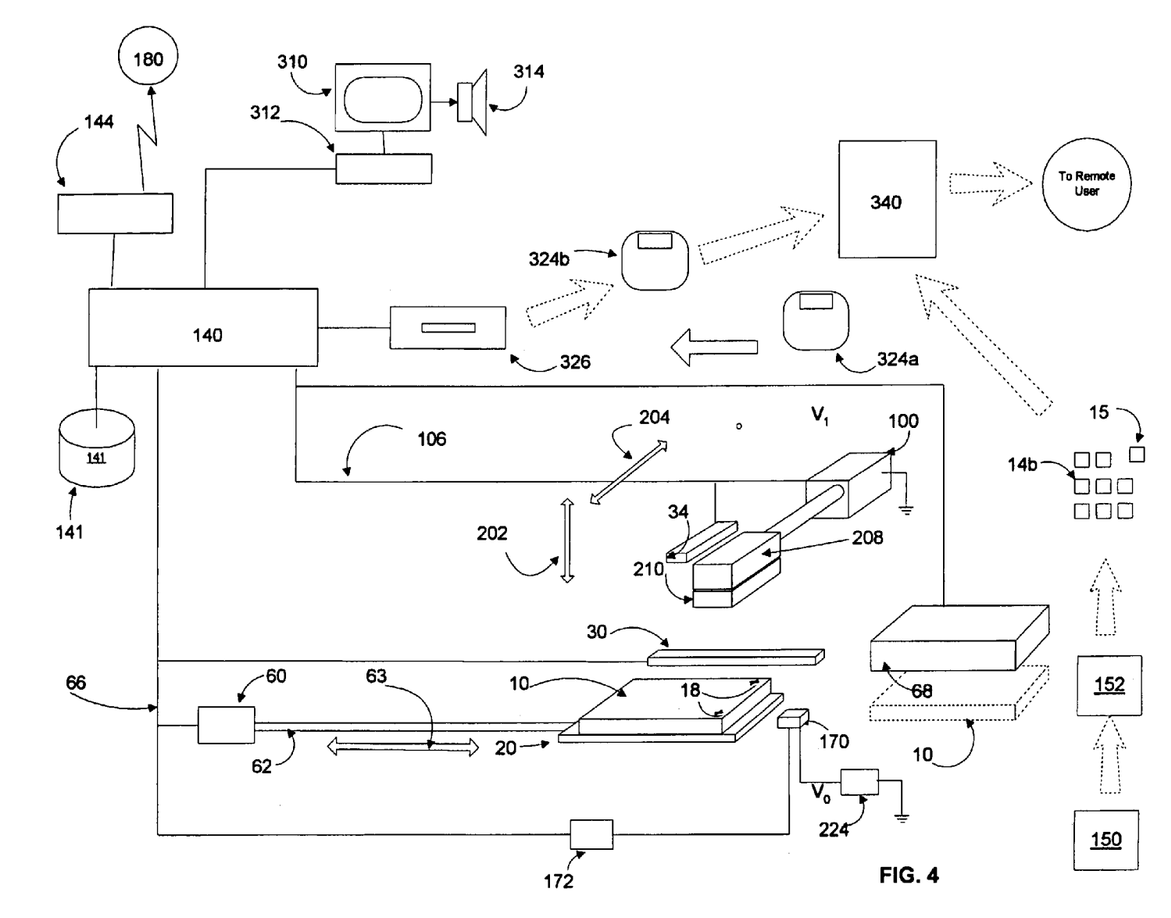
FIG. 4 is a schematic diagram of a drop deposition apparatus of the present invention and also illustrates its use in a method of the present invention.

Referring now to FIG. 4, a drop deposition apparatus of the present invention which can execute a method of the present invention, will now be described. The apparatus shown includes a substrate station 20 on which can be mounted a substrate 10. Pins or similar means (not shown) can be provided on substrate station 20 by which to approximately align substrate 10 to a nominal position thereon. Substrate station 20 can include a vacuum chuck connected to a suitable vacuum source (not shown) to retain a substrate 10 without exerting too much pressure thereon, since substrate 10 is often made of glass. A flood station 68 is optionally provided which can expose the entire surface of substrate 10, when positioned beneath station 68 as illustrated in broken lines in FIG. 4. Such a flood station is of particular use in the in situ array fabrication process to expose all of features during each cycle to one or more reagents (for example, oxidizer, deprotection agent, and wash buffer).

A drop dispensing unit in the form of a dispensing head 210 is retained by a head retainer 208. The positioning system includes a carriage 62 connected to a first transporter 60 controlled by processor 140 through line 66, and a second transporter 100 controlled by processor 140 through line 106. Transporter 60 and carriage 62 are used execute one axis positioning of station 20 (and hence mounted substrate 10) facing the dispensing head 210, by moving it in the direction of arrow 63, while transporter 100 is used to provide adjustment of the position of head retainer 208 (and hence head 210) in a direction of axis 204. In this manner, head 210 can be scanned line by line, by scanning along a line over substrate 10 in the direction of axis 204 using transporter 100, while line by line movement of substrate 10 in a direction of axis 63 is provided by transporter 60. Transporter 60 can also move substrate holder 20 to position substrate 10 beneath flood station 68 (as illustrated by the substrate 10 shown in broken lines in FIG. 4). Head 210 may also optionally be moved in a vertical direction 202, by another suitable transporter (not shown). It will be appreciated that other scanning configurations could be used. It will also be appreciated that both transporters 60 and 100, or either one of them, with suitable construction, could be used to perform the foregoing scanning of head 210 with respect to substrate 10. Thus, when the present application recites "positioning" one element (such as head 210) in relation to another element (such as one of the stations 20 or substrate 10), or "scanning" the head 210 over substrate 10, it will be understood that any required moving or scanning can be accomplished by moving either element or a combination of both of them. An encoder 30 communicates with processor 140 to provide data on the exact location of substrate station 20 (and hence substrate 10 if positioned correctly on substrate station 20), while encoder 34 provides data on the exact location of holder 208 (and hence head 210 if positioned correctly on holder 208). Any suitable encoder, such as an optical encoder, may be used which provides data on linear position.

Processor 140 also has access through a communication module 144 to a communication channel 180 to communicate with a remote station. Communication channel 180 may, for example, be a Wide Area Network ("WAN"), telephone network, satellite network, or any other suitable communication channel.

Head 210 may be of a type commonly used in an ink jet type of printer and may, for example, include five, six, ten or more chambers (for example, at least one for each of four nucleoside phosphoramidite monomers plus at least one for an activator solution) each communicating with a corresponding set of multiple drop dispensers. Each dispenser includes a dispensing orifice and an ejector which is positioned in the chamber communicating with the orifice, opposite the orifice. Each ejector is in the form of an electrical resistor operating as a heating element under control of processor 140 (although piezoelectric elements could be used instead). Each orifice with its associated ejector and portion of the chamber, defines a corresponding pulse jet dispenser. It will be appreciated that head 210 could, for example, have more or less pulse jets as desired (for example, at least ten or at least one hundred pulse jets). Application of a single electric pulse to an ejector will cause a droplet to be dispensed from a corresponding orifice. Certain elements of the head 210 can be adapted from parts of a commercially available thermal inkjet print head device available from Hewlett-Packard Co. as part no. HP51645A. Alternatively, multiple heads could be used instead of a single head 210, each being similar in construction to head 210 and being provided with respective transporters under control of processor 140 for independent movement. In this alternate configuration, in the case of the polynucleotide in situ fabrication process, each head may dispense a corresponding biomonomer (for example, one of four nucleoside phosphoramidites) or an activator solution. In the case of the deposition of previously obtained polynucleotides, each such head may simply provide more pulse jets by which additional different or the same polynucleotides can be dispensed. One construction of head 210 is described in U.S. patent application Ser. No. 09/150,507 filed Sep. 9, 1998 entitled "A MULTIPLE RESERVOIR INK JET DEVICE FOR THE FABRICATION OF BIOPOLYMER ARRAYS", incorporated herein by reference.

As is well known in the ink jet print art, the amount of fluid that is expelled in a single activation event of a pulse jet, can be controlled by changing one or more of a number of parameters, including the orifice diameter, the orifice length (thickness of the orifice member at the orifice), the size of the deposition chamber, and the size of the heating element, among others. The amount of fluid that is expelled during a single activation event is generally in the range about 0.1 to 1000 pL, usually about 0.5 to 500 pL and more usually about 1.0 to 250 pL. A typical velocity at which the fluid is expelled from the chamber is more than about 1 m/s, usually more than about 10 m/s, and may be as great as about 20 m/s or greater. As will be appreciated, if the orifice is in motion with respect to the receiving surface at the time an ejector is activated, the actual site of deposition of the material will not be the location that is at the moment of activation in a line-of-sight relation to the orifice, but will be a location that is predictable for the given distances and velocities.

The apparatus can deposit droplets to provide features which may have widths (that is, diameter, for a round spot) in the range from a minimum of about 10 $\mu$m to a maximum of about 1.0 cm. In embodiments where very small spot sizes or feature sizes are desired, material can be deposited according to the invention in small spots whose width is in the range about 1.0 $\mu$m to 1.0 mm, usually about 5.0 $\mu$m to 500 $\mu$m, and more usually about 10 $\mu$m to 200 $\mu$m.

The apparatus further includes a display 310, speaker 314, and operator input device 312. Operator input device 312 may, for example, be a keyboard, mouse, or the like. Processor 140 has access to a memory 141, and controls print head 210 (specifically, the activation of the ejectors therein; this can be done through line 106 also), operation of the positioning system, operation of each jet in print head 210, and operation of display 310 and speaker 314. Memory 141 (or any other memory herein) may be any suitable device which allows 140 to store and retrieve data on any suitable storage medium, such as magnetic, optical, or solid state storage medium (including magnetic or optical disks or tape or RAM, or any other suitable medium, either fixed or portable). Processor 140 may include a general purpose digital microprocessor suitably programmed from a computer readable medium carrying necessary program code, to execute all of the steps required by the present invention, or any hardware or software combination which will perform those or equivalent steps. The programming can be provided remotely to processor 141, or previously saved in a computer program product such as memory 141 or some other portable or fixed computer readable storage medium using any of those devices mentioned below in connection with memory 141. For example, a magnetic or optical disk 324a may carry the programming, and can be read by disk writer/reader 326.

A writing system which is under the control of processor 140, includes a writer in the form of a printer 150 which can write identifications onto substrate 10 by printing them in the form of the bar codes 356 (or alternatively on a housing carrying the substrate) each in association with a corresponding array 12 as shown in FIG. 1. Printer 150 may accomplish this task before or after formation of the array by the drop deposition system. The writing system further includes a data writer/reader 326 (such as an optical or magnetic disk drive) which can write data to a portable computer readable storage medium (such as an optical or magnetic disk). A cutter 152 is provided to cut substrate 10 into individual array units 15 each carrying a corresponding array 12 and bar code 356.

Figure 6A:
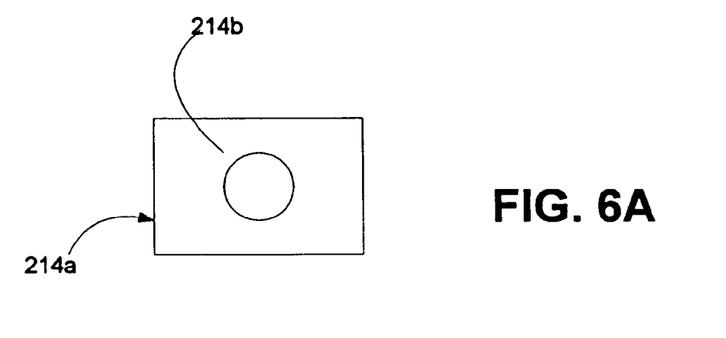
FIG. 6 illustrates different types of sensing elements.
Figure 6B:
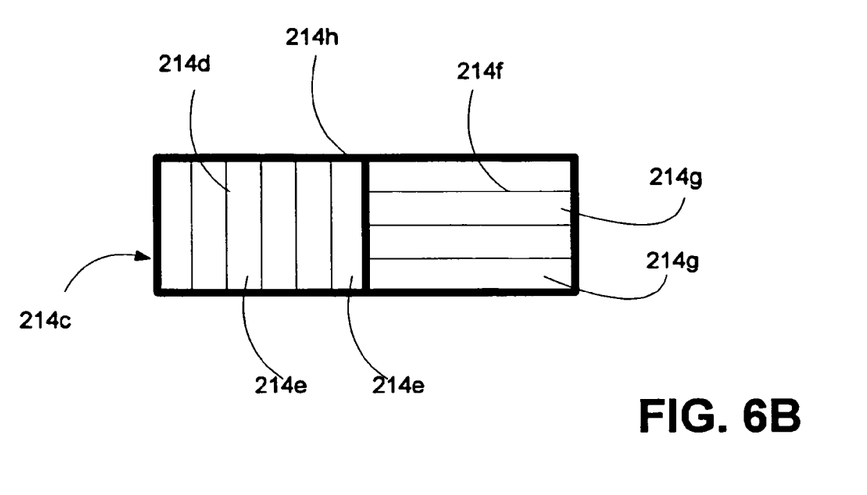
Figure 6C:
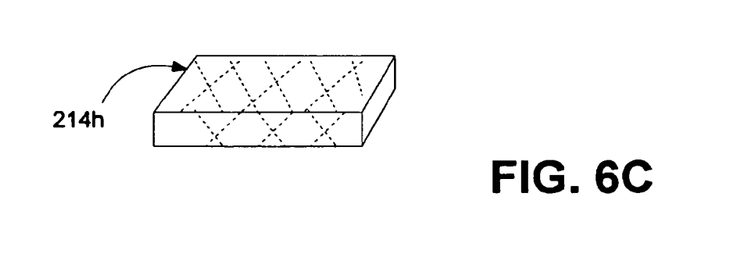

The drop deposition apparatus further includes a sensing element 214 communicating through an amplifier 172 with processor 140. Sensing element 214 may take the form of sensing element 214a shown in FIG. 6A, which is simply a flat thin metal plate optionally having an opening 214b through it. Opening 214 acts as an insensitive region intermediate sensitive regions (that is, the remainder of the plate surrounding the opening 214b). Alternatively, a sensing element 214c, such as shown in FIG. 6B may be used. Sensing element 214c has a first plurality of parallel conductors 214d and intervening open spaces 214e, and a second plurality of parallel conductors 214f with intervening open spaces 214g. Open spaces 214e and 214g also act as insensitive regions intermediate sensitive regions (the parallel conductors). Opening 214b and open spaces 214e and 214g, are dimensioned to allow a droplet of the size expected from each pulse jet, to pass through without contacting a sensitive region of the sensing element. Conductors 214d and 214f may or may not be insulated from one another at a frame 214h of sensing element 214c. If they are insulated, this will permit further resolution of drop position information as described below. A preferred sensing element 214d is illustrated in FIG. 6C. Sensing element 214j is an absorbent wicking material soaked in non-volatile (that is, doesn't evaporate quickly) conductive solution (for example, an aqueous NaCl solution). This allows for high volumes of fluid to be deposited and contained without the need for maintenance or variations in sensor height due to drop buildup.

Figure 7:
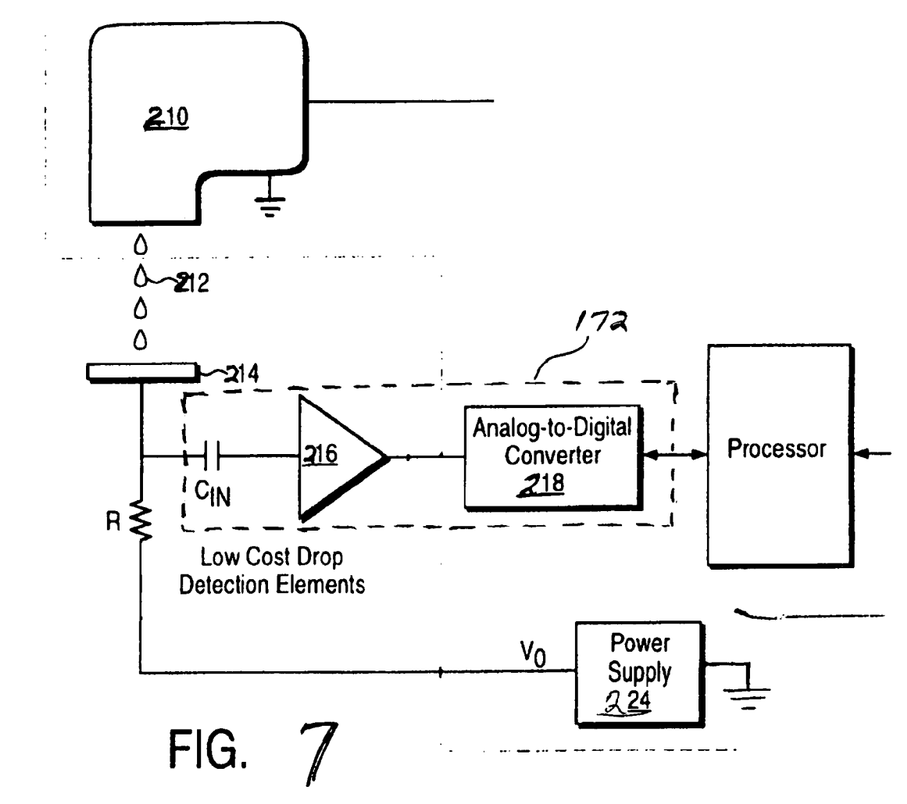
FIG. 7 is a schematic illustrating a particular configuration of a sensing unit and amplifier of the fabrication apparatus of FIG. 4.

A power supply 224 delivers a positive potential $V_0$ (for example, about 100 V) to sensing element 214 with respect to head 210. As seen more clearly from the schematic of FIG. 7, amplifier 172 includes amplifier circuit 216 and an Analog/Digital converter 218 in communication with processor 140. In an alternative arrangement the amplifier 172 may have its input connected to substrate station 20 such that, provided power supply 224 provides a sufficient potential differential between head 210 and station 20, substrate station 20 and a substrate 10 mounted thereon act as the sensing element. In this configuration, a signal will be detected by processor 140 each time a droplet strikes a mounted substrate 10.

With any of the foregoing arrangements, when a droplet dispensed from head 210 strikes the sensing element, an electrical stimulus (in the form of a charge carried by each such droplet) is provided to the sensing element. As a result a signal is provided to processor 140 which corresponds to the charge imparted to the droplet by power supply 224. Such a signal then, will vary with the size of the droplet (and no signal will be generated when a droplet anticipated to strike the sensing element fails to do so).

Figure 5:
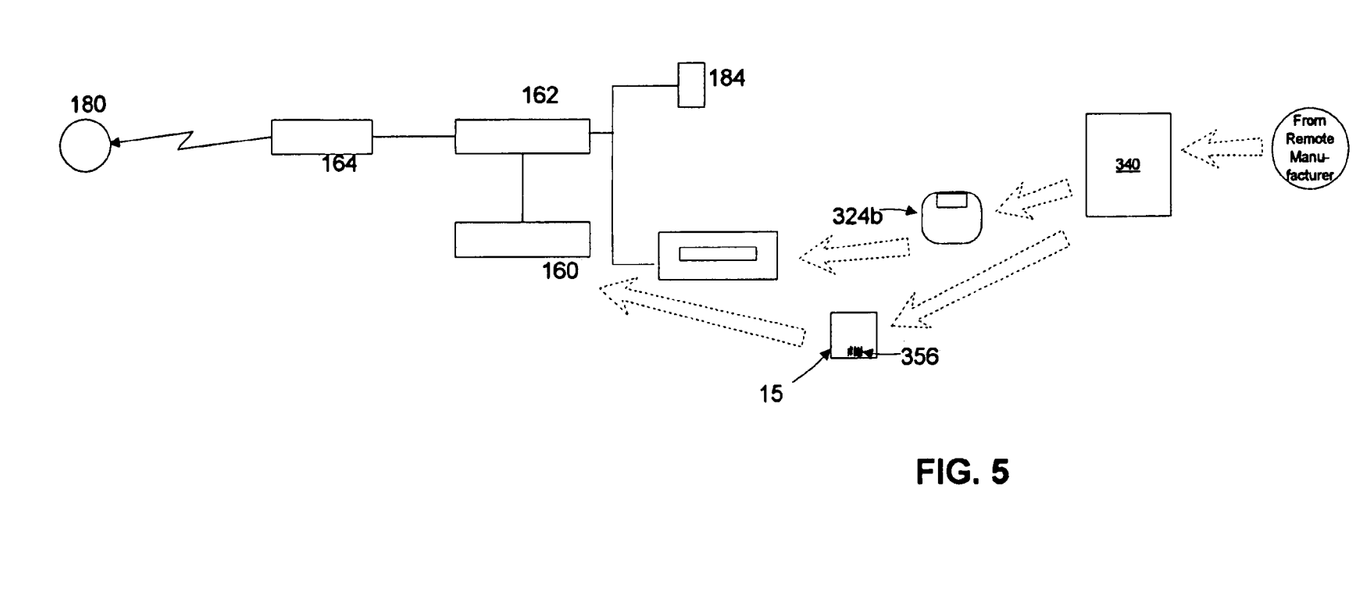
FIG. 5 is a schematic diagram of an apparatus at a user site which can execute a method of the present invention.

The above described components in FIG. 4 represent an apparatus for producing an addressable array, which is sometimes referenced herein as a "fabrication station". FIG. 5 illustrates an apparatus for receiving an addressable array, in particular a single "user station", which is remote from the fabrication station. The user station includes a processor 162, a memory 184, a scanner 160 which can interrogate an array, data writer/reader 186 (which may be capable of writing/reading to the same type of media as writer/reader 320), and a communication module 164 which also has access to communication channel 180. Memory 184 can be any type of memory such as those used for memory 141. Scanner 160 can be any suitable apparatus for interrogating an array, such as one which can read the location and intensity of fluorescence at each feature of an array following exposure to a fluorescently labeled sample. For example, such a scanner may be similar to the GENEARRAY scanner available from Hewlett-Packard, Palo Alto, Calif. Scanner 160 also includes though, a first bar code reader to read a each bar code 356 appearing on segment 15.

It will be understood that there may be multiple such user stations, each remote from the fabrication station and each other, in which case the fabrication station acts as a central fabrication station (that is, a fabrication station which services more than one remote user station at the same or different times). One or more such user stations may be in communication with the fabrication station at any given time. It will also be appreciated that processors 140 and 162 can be programmed from any computer readable medium carrying a suitable computer program. For example, such a medium can be any memory device such as those described in connection with memory 141, and may be read locally (such as by reader/writer 320 in the case of processor 140 or writer/reader 186 in the case of processor 162) or from a remote location through communication channel 180.

The operation of the fabrication station will now be described. It will be assumed that a substrate 10 on which arrays 12 are to be fabricated, is mounted in position on station 20 and that processor 140 has access in memory 141 to the array layout information to fabricate target arrays 12. Processor 140 will then determine the drive pattern (the instructions to the positioning system and head 210) necessary to obtain the target array. Alternatively, memory 141 may already be pre-loaded with the drive pattern. Processor 140 will generate a unique identification for each array 12 in the form of a corresponding bar code 356. Each identifier may be stored in memory 141 in association feature information obtained from sensing element 214 as described below.

Processor 140 controls fabrication, as described above, to generate the one or more arrays on substrate 10 by depositing for each target feature, one or more of the reagent droplets required to form that feature. During fabrication, processor 140 scans head 210 line by line across substrate 10 my moving head 210 and substrate 10 as described above, while co-ordinating dispensing of required droplets, so as to fabricate the desired array on substrate 10. Processor 140 may also send substrate 10 to flood station 68 for intervening or final steps as required. The steps will occur in accordance with the conventional deposition of previously obtained polynucleotides or the in situ polynucleotide array fabrication process, both described above. Particularly in the case of the deposition of previously obtained polynucleotides, processor 140 may load and reload head 210 from a load station (not shown) with different polynucleotide solutions as necessary to complete the array. Preferably at each feature, during any one cycle multiple droplets of a reagent may be deposited.

In the case where the sensing element is a sensing element 214, processor 140 may additionally co-ordinate the positioning of head 210 over sensing element with the dispensing of droplets. One or more performance characteristics of the deposition apparatus can be evaluated based on the electrical signals provided to processor 140 from amplifier 172, which signals result from dispensed droplets striking sensing element. Processor 140 will control the apparatus and interpret the signals from the sensing element in accordance with the performance characteristic to be evaluated. For example, since pulse jets typically require priming the evaluated performance characteristic may be whether one or more of the pulse jets of head 210 are primed. In this case, when head 210 is positioned over sensing element 214 and a particular pulse jet is fired by processor 140, if a corresponding signal is obtained from sensing element 214 then priming is indicated. If no corresponding signal is obtained from sensing element 214, then a de-primed condition is indicated.

Other evaluated performance characteristics include droplet size, as previously discussed. Velocity of droplets ejected by a pulse jet may also be evaluated, as this can provide an indication of how much a droplet might spread or whether it might splatter, upon striking substrate 10 during array fabrication. Droplet velocity can be evaluated in any one of a number of ways. For example, the difference in time between when between when processor 140 activates a pule jet and the time when a resulting signal is obtained from the sensing element, can be measured by processor 140. Alternatively, multiple droplets in the form of a series of droplets, may be dispensed at a same frequency for each of at least two different distances of a pulse jet from the sensor (which distances will be known by processor 140 through precision movement or one or more encoders). In this case, droplet velocity can be evaluated based on the phase difference between the detected signals. A further evaluated performance characteristic may be detection of broken up drops. For example, if a drop ejected from a pulse jet produces a series of closely spaced detected signals, this may indicate that a single expected drop corresponding to a pulse delivered to a pulse jet, has broken up into a number of smaller droplets before reaching the substrate.

Another evaluated performance characteristic includes the placement of droplets, particularly an angle at which a droplet is ejected from a pulse jet. If a droplet is ejected at an angle, this means that it will be displaced from an intended target position which is based only on the relative positioning of head 210 and substrate 10. Droplet placement can be evaluated, for example, based on different relative positions of the pulse jet dispenser and the sensing element, when a series of droplets fired from the pulse jet by processor 140 begin or cease striking the sensing element (as determined by processor 140 based on the signal from the sensing element). For example, this can be taken as the relative positions when such a droplet series passes onto or off the sensitive region of sensing element 214a, either about the opening 214b (that is, when the droplets begin or cease passing completely through opening 214b) or an outer edge of the element. Alternatively, in the case of sensor element 214c, particularly where each conductor 214d and 214f provides a corresponding signal to processor 140, more precise droplet position information can be obtained in two dimensions.

Processor 140 can be programmed to make any one or more of the evaluations at various times in the fabrication process. For example, any one or more of the above described characteristics (priming, velocity, drop placement, or drop size) may be evaluated before dispensing any droplets onto a substrate 10, or after or during fabrication of one or more arrays on substrate 10 as head 210 passes beyond substrate 10. For example, it may particularly be desirable to check priming of each pulse jet before any droplets are dispensed onto a substrate to begin forming any of the arrays. In the case where head 210 is re-loaded, such as to change a set of one more reagents in head 210 to a different set of reagents (for example, from one set of previously obtained polynucleotides to a different set), it may be desirable to perform the detection and re-loading evaluation after the re-loading and before dispensing any droplets for an array. Any one of priming, droplet velocity, placement, or size, may particularly be evaluated following one or more (or all) of the repeated scans of head 210 across substrate 10 to form one or more arrays, as head 210 passes beyond substrate 10 under control of processor 140.

As mentioned above, substrate station 20 and a mounted substrate 10 together may act as the sensing element. It will be appreciated that head 210 and the positioning system can be controlled by processor such that any one of priming, droplet velocity, and droplet placement (using an edge of mounted substrate 10 or substrate station 20), can also be evaluated in this configuration. It will also be appreciated that any evaluation such as for priming or droplet size, can be based on signals from a series of droplets and or just one droplet. Signals for a series of droplets may be averaged where appropriate (for example, when checking for priming, velocity or droplet size). This is particularly true when during a cycle of deposition at each feature, a series of multiple droplets of the same composition is deposited. In such a case, the same number of multiple droplets may be used for an average figure for the evaluation (for example, for droplet size). In another example, a burst of droplets may be used at a frequency to which the amplifier is specifically tuned, in a manner described in U.S. patent application Ser. No. 08/946,190 filed Oct. 7, 1997 for "LOW COST INK DROP DETECTOR", incorporated herein by reference.

Various operating parameters may be used for power supply 224. For example, a potential difference of between about greater than 0 to about 100 volts may conveniently be used (for example, between 15 to 60 volts, or higher). With typical droplet sizes in the ranges mentioned above, with head 210 positioned about 0.7 mm from sensing element 214, a signal in the form of about a 4 to 6 volt spike may be obtained as an output from amplifier 172 when a dispensed droplet strikes the sensing element (although this can be adjusted by the amount of amplification by amplifier 172).

Various uses may be made of the evaluated performance characteristics. For example, processor 140 may be programmed with a predetermined tolerance for the one or more evaluated performance characteristics such that an error is registered when the evaluated characteristic is outside the tolerance. The tolerance may be zero or some other predetermined figure. For example, for evaluating priming, if processor 140 operates head 210 to dispense a series of droplets and less than the total number is detected, no tolerance may be allowed such that this condition is registered as a de-primed condition (at least on a first check). When an error is indicated, the fabrication procedure may be halted until the source of the error is corrected. Correction may be accomplished by an operator (for example, by replacing head 210) in response to an operator alert display 310 or speaker 314, or may be performed by processor 140 where the evaluated error is of a type which processor 140 evaluates as being correctable by it. For example, in the case of de-priming, processor 140 may fire the de-primed pulse jet one or more times until it is primed (as determined when a signal from sensor element 214 corresponding to the firing signal, is received by processor 140). Alternatively, for some errors detected for a given substrate 10, processor 140 may operate the deposition apparatus to compensate for this error during dispensing of droplets onto the same or other substrates 10. This can be done by modifying the drive pattern in a manner described in U.S. patent application Ser. No. 09/359,527 filed Jul. 22, 1999 for "BIOPOLYMER ARRAYS AND THEIR FABRICATION", incorporated herein by reference. For example, when one pulse jet is evaluated as being non-functional, and processor 140 has access to head configuration data in memory 141 and determines from that data that another pulse jet is in communication with the same chamber and can therefore deliver the same reagent, processor 140 can then modify the drive pattern so that such other pulse jet fires in place of the non-functional pulse jet. As another alternative, the error may be used to reject any one or more of arrays partially or completely fabricated on substrate 10, determined by processor 140 as having been affected by the error. Alternatively, even before commencing fabrication of an array, variations in one or more performance characteristics of one or more of the pulse jets, in response to variations in one or more pulse jet drive signal parameters provided by processor 140 (for example, pulse maximum voltage and/or duration) may be evaluated based on the signal from the sensor. Such information can be used to determine the best operating parameters for the one or more pulse jets.

As a further alternative, processor 140 may correlate the error (either qualitatively or quantitatively) with the one or more features of the array which are defective (that is, having a characteristic outside a predetermined tolerance) as a result of the error. For example, if a given pulse jet was evaluated as producing undersized features for which it was used to form (because the droplets dispensed by that pulse jet were undersized), that information can be correlated with those features either qualitatively (that is, an indication that those features are undersized) or qualitatively (that is, an indication that those features are of a particular size). Such error information can be saved into memory 141. in association with the corresponding unique identifier generated by processor 140 for that array (as mentioned above). Alternatively or optionally, such error information can be stored onto a portable storage medium 324b in association with the corresponding array unique identification, by writer/reader 326 for provision to a remote user. Storage medium 324b may be any suitable medium for carrying the error information, including machine readable media such as optical or magnetic disks or tape or solid state memory, or hard copy media such as a paper printout carrying the error information in the form of bar codes (or other codes). It will be understood that the data form of error information can be in different forms though, such as being absolute data or relative data (such as relating only the degree and location of errors).

Either before array fabrication on substrate 10 has been commenced, or after it has been completed, substrate 10 may be sent to writer 150 which, under control of processor 140, writes the unique bar codes 356 on substrate 10 each in association with its corresponding array (by being physically close to it in the manner shown in FIG. 1). The substrate 10 is then sent to a cutter 152 wherein portions of substrate 10 carrying an individual array 12 and its associated local identifier 356 are separated from the remainder of substrate 10, to provide multiple array units 15. The array unit 15 is placed in package 340 with storage medium 324b (if used) carrying error information, and the package then shipped to a remote user station.

The above sequence can be repeated at the fabrication station as desired for multiple substrates 10 in turn. As mentioned above, the fabrication station may act as a central fabrication station for each of multiple remote user stations, in the same manner as described above. Whether or not the fabrication station acts as a central fabrication station, it can optionally maintain a database of unique array identifiers in memory 141, each in association with the corresponding error information.

At the user station of FIG. 5, the resulting package 340 is then received from the remote fabrication station. A sample, for example a test sample, is exposed to the array 12 on the array unit 15 received in package 340. Following hybridization and washing in a known manner, the array is then inserted into scanner 160 and interrogated by it to obtain interrogation results (such as information representing the fluorescence pattern on the array 12). The first reader in scanner 160 also reads the identifier 356 present on the array substrate 10 in association with the corresponding array 12. Using identifier 356, processor 162 may then obtain the corresponding error information for array 12 from portable storage medium 324b or from the database of such information in memory 141 by communicating with that database through communication module 164 and communication channel 180.

Once processor 162 has obtained the error information for an array 12, it can then control interrogation of the corresponding array by scanner 160 and/or the processing of the results of the interrogation, using such information. For example, the error information may indicate a specific feature, which is redundant with another feature on the same array 12, is of such low quality (that is, having a characteristic outside a predetermined range) that the scanner need not interrogate that specific feature for a given test, or alternatively that information read from that feature can be ignored or deleted as useless. Following array interrogation, further processing of the interrogation results can be performed to evaluate the sample composition (such as for a specific target) based on the results of the interrogation. This further processing can be done by processor 162 or by a user examining the interrogation results. The interrogation results (raw data) or processed results from the interrogation results, could be forwarded (such as by communication) to a remote location for further evaluation and/or processing, or use, using communication channel 180 or reader/writer 186 and medium 190. This data may be transmitted by others as required to reach the remote location, or re-transmitted to elsewhere as desired.

In a variation of the above, it is possible that each array 12 and its substrate 10 may be contained with a suitable housing. Such a housing may include a closed chamber accessible through one or more ports normally closed by septa, which carries the substrate 10. In such case, the above mentioned unique identification may be alternatively be placed on the housing, rather than on substrate 10.

Modifications in the particular embodiments described above are, of course, possible. For example, the performance characteristic evaluated may be one of another component of the apparatus rather than of the head 210 (for example, when a pulse jet is known to have particular characteristics, it can be used to evaluate accuracy of positioning of substrate 10 by the positioning system). Also, where a pattern of arrays is desired, any of a variety of geometries may be constructed other than the organized rows and columns of arrays 12 of FIG. 1. For example, arrays 12 can be arranged in a series of curvilinear rows across the substrate surface (for example, a series of concentric circles or semi-circles of spots), and the like. Similarly, the pattern of regions 16 may be varied from the organized rows and columns of spots in FIG. 2 to include, for example, a series of curvilinear rows across the substrate surface(for example, a series of concentric circles or semi-circles of spots), and the like. Even irregular arrangements of the arrays or the regions within them can be used, when some means is provided to an end user to identify the composition of nature of features at respective addresses.

The present methods and apparatus may be used to deposit biopolymers or other moieties on surfaces of any of a variety of different substrates, including both flexible and rigid substrates. Preferred materials provide physical support for the deposited material and endure the conditions of the deposition process and of any subsequent treatment or handling or processing that may be encountered in the use of the particular array. The array substrate may take any of a variety of configurations ranging from simple to complex. Thus, the substrate could have generally planar form, as for example a slide or plate configuration, such as a rectangular or square or disc. In many embodiments, the substrate will be shaped generally as a rectangular solid, having a length in the range about 4 mm to 200 mm, usually about 4 mm to 150 mm, more usually about 4 mm to 125 mm; a width in the range about 4 mm to 200 mm, usually about 4 mm to 120 mm and more usually about 4 mm to 80 mm; and a thickness in the range about 0.01 mm to 5.0 mm, usually from about 0.1 mm to 2 mm and more usually from about 0.2 to 1 mm. However, larger substrates can be used, particularly when such are cut after fabrication into smaller size substrates carrying a smaller total number of arrays 12. Substrates of other configurations and equivalent areas can be chosen. The configuration of the array may be selected according to manufacturing, handling, and use considerations.

The substrates may be fabricated from any of a variety of materials. In certain embodiments, such as for example where production of binding pair arrays for use in research and related applications is desired, the materials from which the substrate may be fabricated should ideally exhibit a low level of non-specific binding during hybridization events. In many situations, it will also be preferable to employ a material that is transparent to visible and/or UV light. For flexible substrates, materials of interest include: nylon, both modified and unmodified, nitrocellulose, polypropylene, and the like, where a nylon membrane, as well as derivatives thereof, may be particularly useful in this embodiment. For rigid substrates, specific materials of interest include: glass; fused silica, silicon, plastics (for example, polytetrafluoroethylene, polypropylene, polystyrene, polycarbonate, and blends thereof, and the like); metals (for example, gold, platinum, and the like).

The substrate surface onto which the polynucleotide compositions or other moieties is deposited may be porous or non-porous, smooth or substantially planar, or have irregularities, such as depressions or elevations. The surface may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethyleneamines, polyarylene sulfides, polysiloxanes, polyimides, polyacetates, and the like, where the polymers may be hetero- or homopolymeric, and may or may not have separate functional moieties attached thereto (for example, conjugated), Various further modifications to the particular embodiments described above are, of course, possible. Accordingly, the present invention is not limited to the particular embodiments described in detail above.

What is claimed is:

1. A method A method of fabricating at least one addressable array of biopolymers with multiple features on a substrate using a drop deposition apparatus having a drop dispenser unit and a sensing element, comprising:
   (a) for each of multiple addresses, dispensing droplets carrying the biopolymers or biopolymer precursors from a drop dispenser unit onto the sensing element, and onto the substrate so as to fabricate the array;
   (b) detecting electrical signals resulting from dispensed droplets striking the sensing element;
   (c) evaluating a performance characteristic of the deposition apparatus based on the detected signals
      wherein the sensing element optionally comprises the substrate; additionally comprising:
      when after the dispensing of some droplets onto the substrate an error is detected in which an evaluated performance characteristic is outside a predetermined tolerance, then the source of the error is corrected prior to dispensing of other of the droplets onto that same substrate or the deposition apparatus is operated so as to compensate for the error during dispensing of other of the droplets onto that same substrate.

2. A method according to claim 1 wherein the error is detected after the dispensing of some of the droplets for an array, and the source of the error is corrected prior to dispensing of other of the droplets for the same array or the deposition apparatus is operated so as to compensate for the error during dispensing of other of the droplets for the same array.

3. A method according to claim 1 wherein:
   multiple arrays are fabricated on the same substrate; and
   wherein the error is detected after the dispensing of droplets for at least one of the arrays on the same substrate, and the source of the error is corrected prior to dispensing of droplets for other of the arrays on the same substrate or the deposition apparatus is operated so as to compensate for the error during dispensing of droplets for the same array or other of the arrays on the same substrate.

4. A method according to claim 1 wherein the dispenser unit comprises a pulse jet which ejects a droplet in response to a signal and which can de-prime, and the error is corrected by re-priming the pulse jet.

5. A method of fabricating at least one addressable array of biopolymers with multiple features on a substrate using a drop deposition apparatus having a drop dispenser unit and a sensing element, comprising:
   (a) for each of multiple addresses, dispensing droplets carrying the biopolymers or biopolymer precursors from a drop dispenser unit onto the sensing element, and onto the substrate so as to fabricate the array;
   (b) detecting electrical signals resulting from dispensed droplets striking the sensing element;
   (c) evaluating a performance characteristic of the deposition apparatus based on the detected signals;
      wherein the sensing element optionally comprises the substrate;
      additionally comprising changing biopolymers or biopolymer precursors in the dispenser unit to different biopolymers or biopolymer precursors, wherein the detection and evaluation are performed after the changing and before a dispensing of any droplets for an array.

6. A method of fabricating at least one addressable array of biopolymers with multiple features on a substrate using a drop deposition apparatus having a drop dispenser unit and a sensing element, comprising:
(a) for each of multiple addresses, dispensing droplets carrying the biopolymers or biopolymer precursors from a drop dispenser unit onto the sensing element, and onto the substrate so as to fabricate the array;
(b) detecting electrical signals resulting from dispensed droplets striking the sensing element;
(c) evaluating a performance characteristic of the deposition apparatus based on the detected signals;
wherein the sensing element optionally comprises the substrate;
additionally comprising when an error is detected in which an evaluated performance characteristic is outside a predetermined tolerance, identifying one or more features on the array which are defective as a result of the error.

7. A method according to claim 6 additionally comprising communicating an identity of the identified defective features to a remote location or saving such information onto a storage medium.

8. A method of fabricating at least one addressable array of biopolymers with multiple features on a substrate using a drop deposition apparatus having a drop dispenser unit and a sensing element, comprising:
(a) for each of multiple addresses, dispensing droplets carrying the biopolymers or biopolymer precursors from a drop dispenser unit onto the sensing element, and onto the substrate so as to fabricate the array;
(b) detecting electrical signals resulting from dispensed droplets striking the sensing element;
(c) evaluating a performance characteristic of the deposition apparatus based on the detected signals
wherein the sensing element optionally comprises the substrate;
and wherein:
the dispenser unit is repeatedly scanned across the substrate while dispensing droplets so as to fabricate the array;
the sensing element is struck by droplets so as to generate electrical signals when the dispenser unit passes beyond the array being fabricated on multiple scans during fabrication of the array.

9. A method according to claim 8 wherein the sensing element is struck by droplets so as to generate electrical signals when the dispenser unit passes beyond the array being fabricated on each of multiple scans during fabrication of the array.

10. A method of fabricating at least one addressable array of biopolymers with multiple features on a substrate using a drop deposition apparatus having a drop dispenser unit and a sensing element, comprising:
(a) for each of multiple addresses, dispensing droplets carrying the biopolymers or biopolymer precursors from a drop dispenser unit onto the sensing element, and onto the substrate so as to fabricate the array;
(b) detecting electrical signals resulting from dispensed droplets striking the sensing element;
(c) evaluating a performance characteristic of the deposition apparatus based on the detected signals
wherein the sensing element optionally comprises the substrate;
and wherein the evaluated performance characteristic is the velocity of droplets dispensed from the drop dispenser unit;
the method additionally comprising dispensing multiple droplets from the dispenser unit at each of at least two different distances from the sensor, and wherein droplet velocity is evaluated based on the phase difference between the detected signal from multiple droplets at each distance.

11. An apparatus for fabricating at least one addressable array of biopolymers on a substrate, comprising:
(a) a drop dispensing unit which can deposit droplets carrying the biopolymers or biopolymer precursors onto different addresses on the substrate so as to fabricate the array;
(b) a sensing element and amplifier to detect electrical signals resulting from dispensed droplets striking the sensing element;
(c) a processor which:
causes the drop dispensing unit to dispense droplets toward the sensing element after the dispensing of some droplets onto the substrate and evaluates a performance characteristic of the dispensing unit based on the resulting detected signals; and
when an error is detected in which an evaluated performance characteristic is outside a predetermined tolerance then the processor, prior to causing the drop dispenser to dispense droplets onto that same substrate, activates an operator alert or operates the apparatus so as to correct for the error before, or compensate for the error during, dispensing of other of the droplets onto that same substrate.

12. An apparatus according to claim 11 wherein:
the processor causes the drop dispensing unit to dispense droplets toward the sensing element after dispensing of some droplets for an array; and
when the error is detected the processor activates the operator alert or operates the apparatus so as to correct for the error before, or compensate for the error during, dispensing of the other droplets for that same array.

13. An apparatus according to claim 11 wherein;
the processor causes the drop dispensing unit to dispense droplets so as to form multiple arrays on the same substrate, and to dispense droplets toward the sensing element after dispensing some of the droplets for the arrays on the same substrate;
when the error is detected the processor operates the apparatus so as to correct for the error before, or compensate for the error during, dispensing of the other droplets for other of the arrays on the same substrate.

14. An apparatus for fabricating at least one addressable array of biopolymers with multiple features on a substrate, comprising:
(a) a drop dispensing unit which can deposit droplets carrying the biopolymers or biopolymer precursors onto different addresses on the substrate so as to fabricate the array;
(b) a sensing element and amplifier to detect electrical signals resulting from dispensed droplets striking the sensing element;
(c) a processor which:
causes the drop dispensing unit to dispense droplets toward the sensing element after the dispensing of some droplets onto the substrate and evaluates a performance characteristic of the apparatus based on the resulting detected signals; and when an error is detected in which an evaluated performance characteristic is outside a predetermined tolerance, identifies one or more features on the array which are defective as a result of the error.

15. An apparatus according to claim 14 wherein the processor additionally communicates an identity of the identified defective features to a remote location or saves such information onto a storage medium.

16. An apparatus for fabricating at least one addressable array of biopolymers on a substrate, comprising:
  (a) a drop dispensing unit which can deposit droplets carrying the biopolymers or biopolymer precursors onto different addresses on the mounted substrate so as to fabricate the array;
  (b) a sensing element and amplifier to detect electrical signals resulting from dispensed droplets striking the sensing element;
  (c) a processor which causes the drop dispensing unit to dispense droplets toward the sensing element and which evaluates a performance characteristic of the apparatus based on the resulting detected signals, wherein the evaluated performance characteristic is the velocity or placement of droplets;
    wherein the processor causes the dispenser unit to dispense multiple droplets at each of at least two different distances from the sensor, and wherein droplet velocity is evaluated based on the phase difference between the detected signal from multiple droplets at each distance.

17. A computer program product comprising a computer readable storage medium carrying computer readable program code, for use with an apparatus for fabricating an array of features which apparatus includes a drop deposition unit and a sensing element, the program code when loaded into the computer performing the steps of:
  (a) for each of multiple addresses, dispensing droplets carrying the biopolymers or biopolymer precursors from a drop dispensing unit onto the substrate, so as to fabricate the array;
  (b) detecting electrical signals resulting from dispensed droplets striking a sensing element during step (a);
  (c) evaluating a performance characteristic of the apparatus based on the detected signals; and
  (d) when an error is detected in which an evaluated performance characteristic is outside a predetermined tolerance then, prior to causing the drop dispenser to dispense droplets onto that same substrate, activating an operator alert or operating the apparatus so as to correct for the error before, or compensate for the error during, dispensing of other of the droplets onto that same substrate.

18. A computer program product comprising a computer readable storage medium carrying computer readable program code, for use with an apparatus for fabricating an array of features which apparatus includes a drop deposition unit and a sensing element, the program code when loaded into the computer performing the steps of:
  (a) for each of multiple addresses, dispensing droplets carrying the biopolymers or biopolymer precursors from a drop dispensing unit onto the substrate, so as to fabricate the array;
  (b) dispensing droplets toward the sensing element after the dispensing of some droplets onto the substrate;
  (b) detecting electrical signals resulting from dispensed droplets striking a sensing element during step (b);
  (c) evaluating a performance characteristic of the apparatus based on the detected signals; and
  (d) when an error is detected in which an evaluated performance characteristic is outside a predetermined tolerance, identifying one or more features on the array which are defective as a result of the error.

* * * * *